March 20, 1945.　　　H. W. SLAUSON　　　2,371,714
NAVIGATIONAL INSTRUMENT
Filed Dec. 27, 1941　　　3 Sheets-Sheet 1
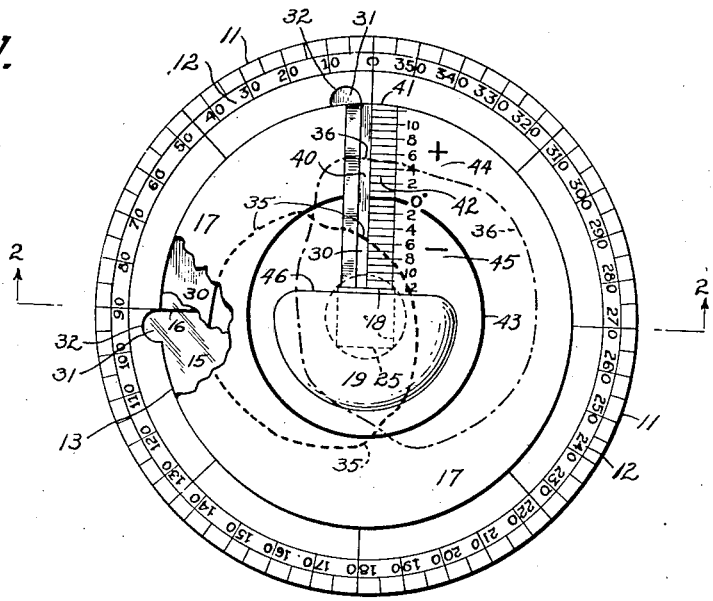
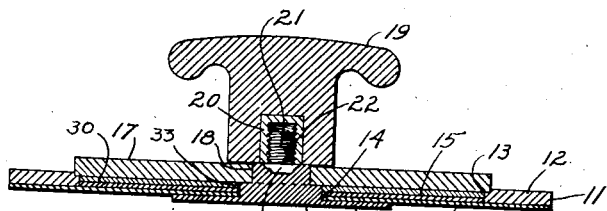
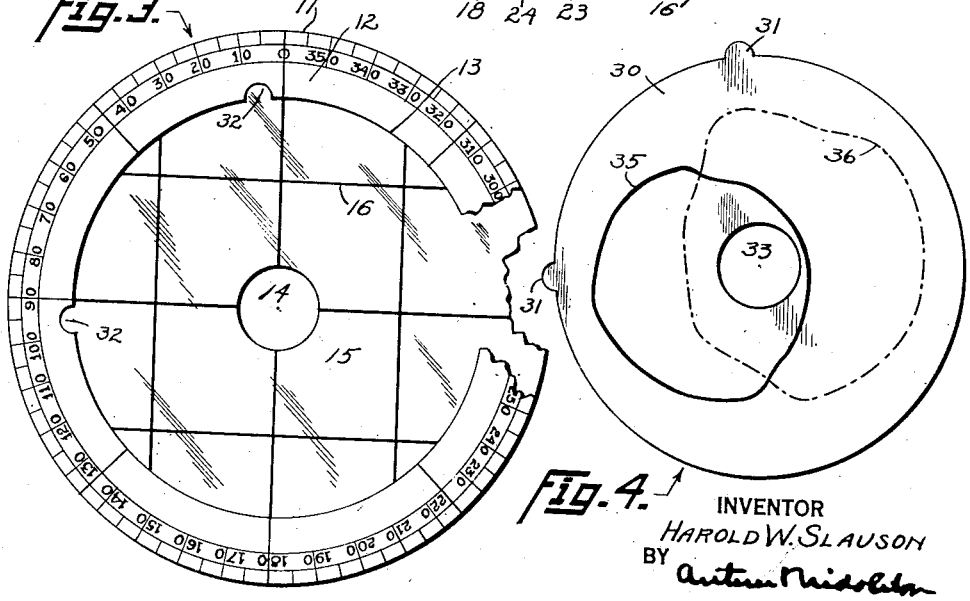
INVENTOR
HAROLD W. SLAUSON
BY
ATTORNEY March 20, 1945.   H. W. SLAUSON   2,371,714
NAVIGATIONAL INSTRUMENT
Filed Dec. 27, 1941   3 Sheets-Sheet 2

INVENTOR
HAROLD W. SLAUSON,
BY
ATTORNEY

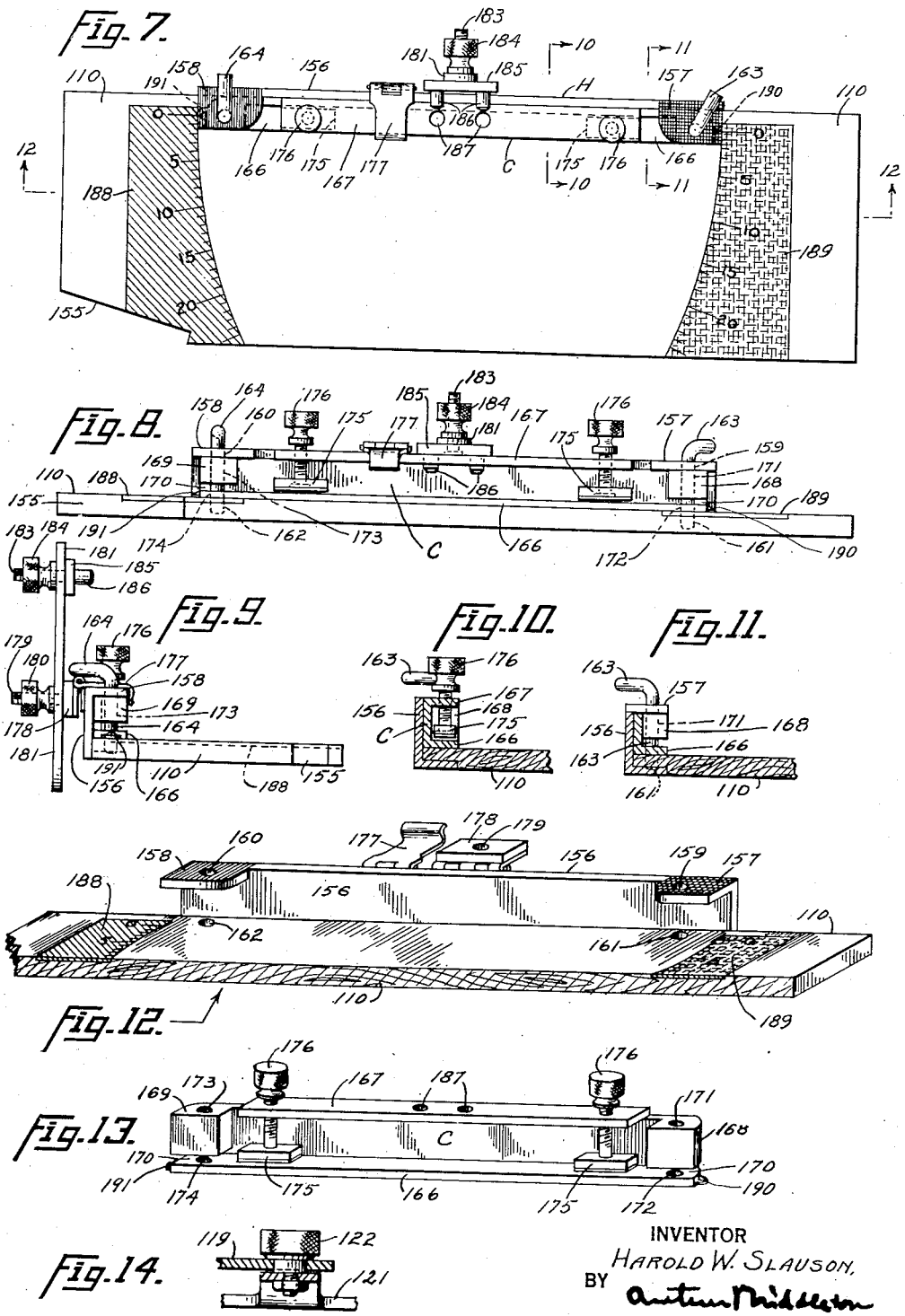

Patented Mar. 20, 1945

2,371,714

UNITED STATES PATENT OFFICE 2,371,714

NAVIGATIONAL INSTRUMENT

Harold W. Slauson, Scarsdale, N. Y.

Application December 27, 1941, Serial No. 424,579

3 Claims. (Cl. 235—61)

This invention relates to navigational or similar instruments such as those possibly used for surveying or map-making. More particularly it relates to mechanical aids for taking compass deviation into consideration.

When afloat, the navigator of a vessel has to consider (1) variation which is the effect on the compass needle of the everchanging magnetic north pole, and (2) deviation which is the effect on the compass needle of changing magnetic conditions on the vessel itself. Variation is a term applied to changing magnetic conditions outside of or beyond the vessel while deviation is a term applied to changing magnetic conditions on the vessel itself. The rate of variation, and its direction, is marked in association with compass roses on government charts, whereas the deviation for each particular vessel must be determined from time to time. The degree or extent, as well as the direction of deviation is usually different with each compass degree, so that a good navigator checks his compass every so often by "swinging ship" or other means and tabulates the degree and direction of deviation of his compass for every few degrees of arc. With this table he can interpolate for any degree of arc that lies between those actually noted for the table.

However, the application of the data of this table to the vessel's compass comprises a mental hazard and is a constant source of possible error. Therefore, an object of this invention is to devise an instrument whereby by turning a knob, the navigator can read off directly, the degree and direction of compass deviation for the course to be steered coincident with the laying of that course, whereupon by simple addition or subtraction, the true course can be determined. Another object of this invention is to devise a compound apparatus or instrument from which not only the deviation can be readily and unmistakably determined but which will also take into consideration the variation. Since deviation is more unstable than variation, due to changing conditions on the vessel, a further object of this invention is to devise the deviation indicating instrument so as to be readily adjustable to meet or compensate for changed deviation causing condition. And a still further object is to devise a deviation indicating instrument that can be used to go from chart to compass or from compass to chart, the latter being necessary when taking bearings with the vessel as the base.

With these, and other objects in view, one feature of the invention may be said to reside in the combination of a compass rose marked on a disc, that is, the disc has marked on or near its periphery, 360 degrees of arc. Associated with the disc held thereon in a temporarily fixed position and relationship by a scale-bearing cover plate is a face on which has been made a cam-shaped graph that portrays the deviation data from chart to compass deduced from swinging the ship. And the card may contain a second similar cam-shaped graph that portrays deviation data from compass to chart. A further and supplemental feature of the invention is the provision of a chart-holding board having a pivoted arm that supports the above described disc and card, so arranged that the variation can be compensated for by the adjusted angle at which the chart can be held with respect to the board.

For the purpose of illustration, one manifestation of the invention is shown in the accompanying drawings. While the best embodiment of the invention now known to me has been so chosen, it is not to be taken as limiting for the invention may take other forms, so long as they or their equivalent fall within the ambit of the appended claims.

In the drawings—

Figure 1 shows a top plan view of a disc assembly, although with sections broken away, that embodies the deviation indicating feature of my invention.

Figure 2 is a vertical sectional view taken along the line 2—2 of Fig. 1.

Figure 3 shows a top plan view of the disc that is adapted to hold the deviation card, while Figure 4 is a top plan view of a deviation card adapted to be associated with the disc of Figure 3.

Fig. 7 shows a plan view of the baseboard 110 with its associated equipment.

Fig. 8 shows a front-edge view of the parts of Fig. 7 looking from bottom to top of that figure—however, the plate 185 in the center of the figure with its knurled nut 184 is open or thrown up in Fig. 7, while it is closed or down in Fig. 8.

Fig. 9 shows an end view of the parts of Fig. 7.

Fig. 10 is a sectional view along the line 10—10 in Fig. 7; and

Figures 5, 6:
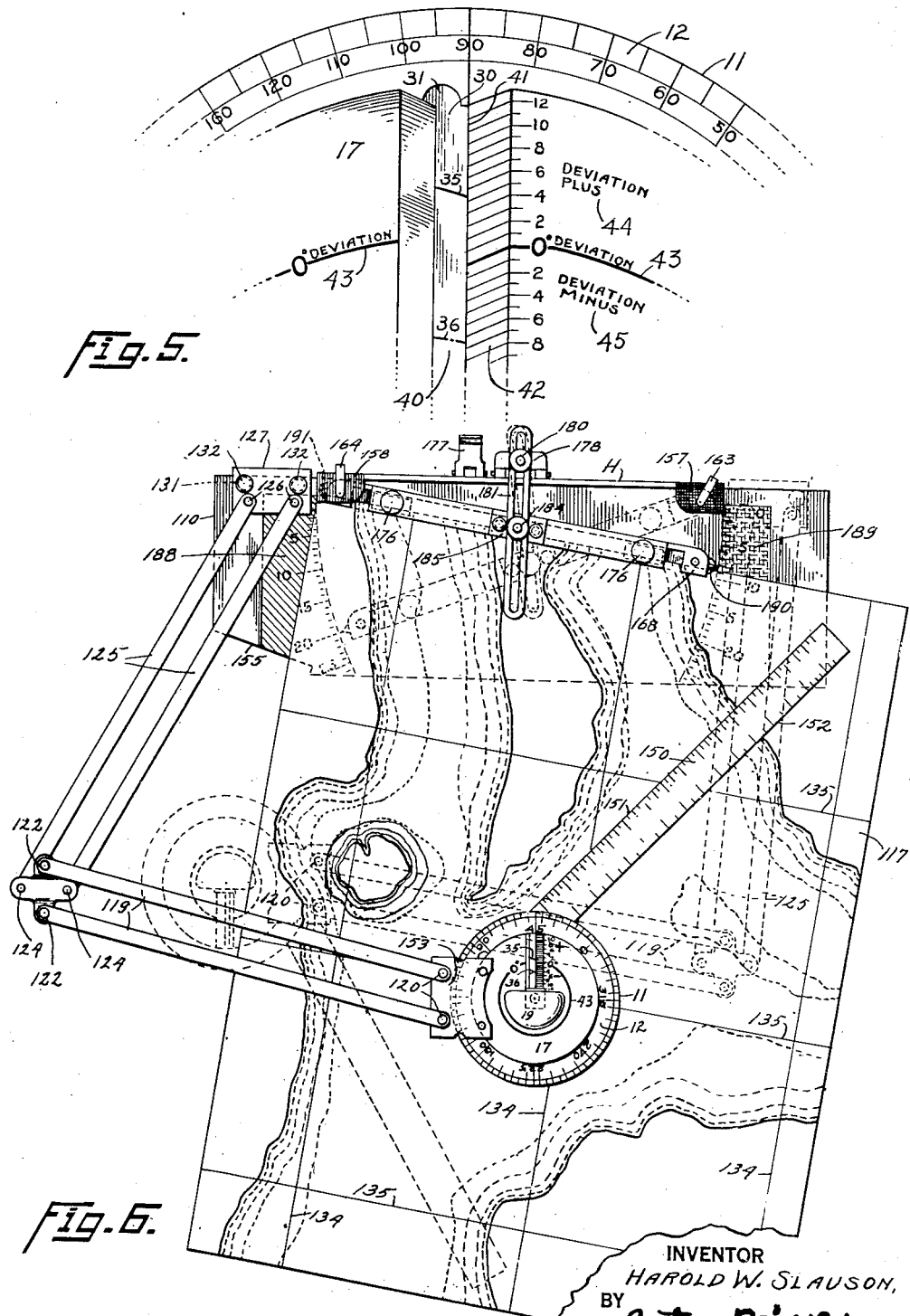
Figure 5 is an enlarged sectional isometric view of a part of the disc, its card and its cover plate.
Figure 6 is a plan view of a complete chart-holding board and a pivoted arm carrying the disc and its associated parts.

Fig. 11, along 11—11 in Fig. 7.

Fig. 12 is an isometric view of the board 110 and those associated parts not removable therefrom; while Fig. 13 shows a similar view of the removable parts.

Fig. 14 is a partial sectional view of a detail of the cruciform member 121 shown at the left of Fig. 6.

In the drawings, the numeral 11 indicates a disc assembly including the disc marked on its annular rim section 12 adjacent to its periphery in degrees of arc through 360°. 13 indicates a recessed central section, and 14 a central round aperture. The bottom of the recess 13 preferably is of transparent material 15 marked with right angled lines 16 that correspond to parallels of longitude and latitude on a chart. This bottom 15 may be held in association with the rim 12 of the disc 11 by a further bottom element 16', also transparent. 17 indicates a plate that fits on top of the disc 11 and which is apertured by a rectangular opening at 18. 19 represents a knob having a screw threaded bottom recess 20 that co-acts with a screw threaded boss 21 on a bolt-like element 22 for holding the disc 11 and its associated parts together. It has a disc-like base 23, a cylindrical section 24 that is complementary with round aperture 14 on the disc assembly 11, a squared section 25 that is complementary to rectangular aperture 18 of the plate 17, and the threaded boss 21 that enters the knob 19. 30 indicates a face or card or disc of paper, wood, plastic or metal of a size and thickness capable of being seated in the recess 13 of the disc assembly 11. It is provided with peripheral tabs 31 adapted to enter the cusps 32 on the inner edge of the rim 12 of disc 11, for holding the card securely against any relative rotational displacement between disc 11 and card 30. The card has a central round aperture 33 similar in size to aperture 14 on the bottom 15, since both bottoms 15 and 16, as well as card 30 must fit over cylindrical section 24 of the bolt-like element 22 for rotational movement thereon. 35 indicates a chart-to-compass deviation graph on card 30 hereinafter described, while 36 indicates a compass-to-chart deviation graph on the card 30, also to be described. The latter is shown in red or in dot and dash lines for more easy identification so as not to confuse it with the graph 35 with which it has nothing to do. These graphs may also be in the form of grooves cut in the card.

The plate 17 is provided with a radially extending slot 40 adjacent one edge of which, such as the right hand edge in Figs. 1 and 5, is bevelled as at 41 for carrying on the face thereof in legible fashion the markings 42 of a scale that run up onto the flat face of the plate 17 where consecutive numerals appear on both sides of a zero mark 43. The zero mark extends as a circular line on the plate, on the outer side of which appears some indicating legend 44 as a plus sign to indicate west, while within the circular line appears a corresponding but complementary legend 45 such as a minus sign for east. 46 indicates a cut-away portion on the knob 19 so as not to obscure the slot 40.

The cam-shaped graph 35 on card 30 is prepared as follows: The device is assembled in the arrangement shown but with a blank card 30 fitted into the recess 13 of the disc 11, with tabs 31 of the card neatly fitted into the cusps 32 of the disc 11. The plate 17 is then emplaced and the knob 19 put on to hold the parts in place, but the knob is not screwed up so tightly but what the disc 11 can be rotated without rotating the card 30. The disc 11 is rotated to bring the zero degree mark into radial alignment with the bevelled edge 41. Then from the data learned by swinging ship, it will be found, say, that the compass has an easterly deviation of 5 degrees. A pencilled dot is placed on the card 30 through the slot 40 opposite minus 5 on the scale 42. Then, the disc 11 is rotated to bring, say, 20° in alignment with the bevelled edge. Data from swinging ship will show that the deviation for 20° is, say, minus 2°. Whereupon another pencilled dot is placed at that point on the card. Next, the disc is turned to, say, 40°. Data shows that at this heading, the deviation is 0°. Another pencilled dot is applied to the card. And so on through as many headings as data was taken for in swinging ship. Then the plate 17 is removed to expose the card 30, whereupon the pencilled dots are connected into a graph that takes generally the form of the contour of a cam, and thus the graph 35 is formed, or data may be obtained at any time on any course on which the compass heading may be compared with the charted course.

The graph 36 is made by this same method except that different readings and data are used. They may be obtained from a Napier diagram, a sine curve, or by "trial and error." In this case, the disc 11 has its zero degree mark aligned with the bevelled edge 41. Then the data obtained from swinging ship is observed to find from the deviation reading of zero, what is the true reading. This is just the reverse of the figures used to make the chart to compass graph. Suppose that the data shows that when the deviation reading is 0°, the true reading is 5 degrees westerly or plus. A pencilled dot is then applied to the card opposite plus 5 on the scale 42. The disc 11 is then moved to a reading 10 or 20 degrees away from 0° and the procedure is followed again, using deviation to true instead of true to deviation as in the chart-to-compass graph. When enough dots have been accumulated, the plate 17 is removed to give access to the card 30 whereupon the dots are connected by a dot and dash line to form graph 36 which is the compass to chart graph. Chart-to-compass graph 35 is used for determining the course to be steered, whereas the compass-to-chart graph 36 is used when taking bearings from the vessel.

Assume now that the graphs have been properly made on the card 30 and the parts have all been assembled as shown. Then suppose that the navigator determines from the government chart that he wants to steer a true course of 0° (after having corrected for variation). He turns the parts of the device as shown in Fig. 1 with the bevelled edge 42 aligned with 0° on the disc. The navigator then looks down the slot 40 to see where the graph 35 appears through the slot 40 and particularly where it intersects the scale 42. In Fig. 1 he will see that it intersects the scale at a marking on minus 5. Therefore, he will then move the disc 11 to the left until the bevelled edge is aligned with 0° less 5°, namely, 355° and that will be the compass course to be steered to equal the true course of 0°. Assume, now that the course is to be changed and from the chart, the navigator determines that the true course he wants to follow is 90°. He then moves disc 11 as shown in Fig. 5 to align 90° on the disc scale with the bevelled edge of the slot 40. Next, he looks down the slot until he encounters the graph 35 and observes that it intersects the scale 42 at plus 5. The operator then may move disc 11 to the right until 90 plus 5 or 95° is aligned with the bevelled edge, whereupon he will know that he should steer a compass course of 95° to have his vessel proceed on a 90° true course. However, it is preferable to leave the edge on true (or magnetic) course and to make mental calculation from the slot without moving the card so that the latter can always show the line-of-course or objective on chart.

When taking a bearing from the ship, let us say that by the vessel's compass, the object bears 0°. The navigator turns the parts as shown in Fig. 1, whereupon by glancing down the slot 40 until the compass-to-chart graph 36 is encountered, he sees that that line intersects the scale 42 at plus 5. Then he turns the disc 11 to 0° plus 5° or to 5° and he then knows that the object bears from his vessel 5° true. If the object bore by compass 90°, he would turn the parts as shown in Fig. 5 and would observe that graph 36 gave a scale reading of minus 5°. Next he turns disc 11 to 90° minus 5° or to 85° and that will be the true bearing of the object. And so on.

When in use, the disc-like base 23 rests on the chart and therefore it functions, at least in part, as the support for the other parts. The disc 11 (with its card 30) is rotatably mounted on the cylindrical section 24 of the base 23 while the plate 17 is non-rotatably mounted on the squared section 18. The knob 19 is in effect a clamping means to hold the parts in non-rotational assembly when the knob is tightened, but when loosened, the disc 11 and its card 30 can be readily rotated as a unit.

The device of Figs. 1 to 5 is only capable of indicating changes to compensate for deviational errors. When it is used, variational errors must be calculated and allowed for. However, in the apparatus shown in the remaining figures, the variational errors can also be compensated for.

In Figures 6, 7, et seq., there is shown a small substantially rectangular baseboard 110 that is longer than wide and that is not nearly so large as even the folded size of a chart. Its size is merely sufficient to receive the instrument completely folded thereon. It may be made of suitable ply board, plastic composition, or the like, is preferably substantially rectangular and carries attached along its upper edge an arrangement generically indicated by H, hereinafter more fully described, adapted to hold in position a chart which may have been slipped beneath the clamps before the nuts are tightened if desired. The chart folded to about one-fourth of its full size is shown at 117.

The apparatus also comprises a substantially universal parallel motion mechanism including the plate 17 carried by the parallel arms 119 attached thereto at pivot points 120; the cruciform member 121 carrying the pivots 122 for the opposite ends of the arms 119 spaced apart the same distance as the pivots 120. On an axis at right angles to that passing through the pivots 122 and below the same are mounted the pivots 124 for one end of a pair of parallel arms 125, extending to the pivots 126 with the same spacing as the pivots 124 on the clamp member 127, comprising a U-shaped device having the top arm, a bottom arm and a connecting member. The bottom arm is received against the underside of the baseboard 110, the member against its edge, while the upper arm extends over the upper surface of the base and carries a pair of clamp screws 131 adapted to be manipulated by the knurled heads 132 to secure the clamp firmly to the base in any desired position along its edges.

The parallel motion mechanism just described permits the plate 17 to be moved over a definite area of chart always parallel to its initial position, thereby offering means for determining the angularity of a course on the chart in respect to the true meridian as indicated by any of the longitude lines 134 on the chart or for that matter to the latitude lines or parallels 135.

To permit this the plate 17 has pivotally secured beneath it the graduated disc or protractor 11 that simulates the compass rose on the chart, except that the graduations 12 on this disc are preferably arranged counterclockwise from zero to 360° and cooperate with index mark 42 arranged on inclined surface 41 on the plate 17. These index marks correspond respectively with indicia representing the cardinal compass points north, east, south and west.

The pivoting of the disc 11 to the plate 17 is accomplished as hereinbefore described. The knob 19 provides a convenient operating handle for moving the instrument over the surface of the chart and at the same time permits locking of the disc at the desired angle in respect to the plate.

The disc 11 carries preferably integral therewith the ruler, straight-edge or scale 150, the upper marking edge 151 of which is parallel to the zero-180° diameter of the graduated disc.

This edge, as well as the opposite edge 152, may conveniently be graduated to any suitable scale to replace the usual dividers resorted to for transferring distances to a scale. It may have the usual inch marks with suitable intermediate graduations, or it may have engraved thereon a scale of miles either nautical or statute, preferably in one or more of the ratios used on most charts, for instance 1 to 80,000.

The construction of the apparatus is such that the scale 150 has its upper edge preferably tangential to the periphery of the attached protractor or disc 11. Because of the vertical offset 153 in the plate 17, the arms 119 may move above the scale and it is permitted to rotate through a full 360° without interference with any of the parts of the mechanism carrying the same.

The arms carrying the pivots 122 on the cruciform member 121 are offset upwardly to permit the parallel links 119 to move above the parallel links 125 when necessary so that there is no interference between the same. This arrangement of parts permits the apparatus to be folded into a compact assembly with the scale substantially parallel to the arms 119 and with them overlapping the arms 125. In order that the clamp 127 may be attached to the baseboard 110 when the apparatus is folded for packing, one corner of the baseboard is clipped at the angle shown at 155 which accommodates the clamp 127 when the apparatus is compacted. The clipped portion 155 is longer than the length of the clamp 127, and is designed so that when in the folded position, the clamp 127 lies wholly within the rectangular contour lines of the base 110. (See my Patent No. 2,223,428.)

The navigational chart 117, preferably in folded condition, is held in association with the baseboard 110 by an arrangement or assembly, shown collectively at H that has certain essential functions which can be carried out, for example, by the construction shown, wherein the baseboard 110 has rigidly fixed to the under side thereof, a channel 156 (see Figs. 12 and 9) that has less length than the baseboard 110. It is provided with ears 157 and 158 projecting inwardly over the baseboard and each is provided with an aperture 159 and 160 respectively. The baseboard is provided with holes 161 and 162 arranged in vertical register with the apertures 159 and 160 respectively, so that a pin 163 that has an enlarged head or bent-over handle may pass through aligned aperture 159 and hole 161. A similar headed pin 164 passes through aperture 160 and hole 162.

Arranged for disposition in adjustable relationship with the channel 156, is chart-carrying member or carrier C, substantially U-shaped in cross-section (Fig. 13) having a bottom flange 166 and a top flange 167, with the latter of less length than the carrier body C or its bottom flange 166. The body portion of the carrier C terminates in solid horn-ends 168 and 169 respectively, that are of less depth than the depth of the carrier C so that a slot 170 is provided between the bottom of the horn-end and the bottom flange 166 of the carrier, so that the chart 117, even when folded will pass through the slots 170. A hole 171 passes through the horn-end 168 that is aligned with an aperture 172 in the bottom flange 166 through which pin 163 can pass when it also passes through aligned apertures 159 and 161 of the channel 156 (Fig. 8). Similarly, the horn-end 169 has a hole 173 that is aligned with aperture 174 in the bottom flange 166 of the channel 156, so that when the carrier is in secured position with the channel 156, pin 164 passes through not only the hole 173 and aperture 174 but the apertures 160 and 162 of the channel 156.

The top flange 167 of the carrier C is provided with a plurality of clamping members or clamps 175 vertically adjustable to and from clamping position against the bottom flange 166, by means of headed adjusting screws 176. The channel 156 is provided with a hinged clamping bent finger 177, and also with a plate 178 hinged to the channel. Projecting from the plate 178 is a threaded pin 179 that has associated with it a knurled nut 180. Adapted to be clamped between the plate 178 and the knurled nut 180 is a guide member 181 having a slot 182 through which the knurled pin 179 passes. At a free end of the guide 181 and also passing through the slot 182, is a threaded pin 183 having a knurled nut 184. On the other end of the pin 183 from the nut 184, is a small plate 185 provided with one or more projecting dowel-shaped pins 186. These dowel-like pins 186 are adapted to fit slidingly into holes 187 in the top flange of the carrier C, under certain conditions.

Adjacent the left hand side of the baseboard 110, is a scale 188 preferably of some bright color such as red. The right hand edge of the scale is curved on a radius swung from the pin 163. The scale is marked in degrees of easterly variation. A similar scale 189 is provided at the right hand of the baseboard 110 in some other bright color, such as green, and its left hand edge is curved on a radius swung from pin 164. This scale is marked in degrees of westerly variation. If easterly variation is to be compensated for, the left hand pin 164 is removed and the carrier, with its chart, is swung about right hand pin 163 as a pivot. For that reason pin 163 may well be colored to match the color of the easterly variation scale 188, whereas pin 164 can be colored to match the westerly variation scale 189. The ears 159 and 157 may also be similarly colored so that no mistake is made as to which pin affects which scale.

In mechanical operation, the chart is clamped to the chart carrier C by means of the screw operated clamps 175 and 176 to hold the chart firmly to the bottom flange 166 of the carrier C. After observing that it is, say, westerly variation that is to be compensated for, the left hand edge of the chart, either open or folded, should not extend far enough beyond the left hand end of the carrier to interfere with the clamp 127 and its parallel arms 125. Suppose now from observing the compass rose nearest to the course to be steered, the variation is shown to be 9° west. Pin 163 at the right hand of the assembly H is removed and the carrier with its chart is swung about the left hand pin 164 as a pivot until the pointer 190 at the right end of the carrier C reaches 9° on the westerly variation scale 189. Thereupon the carrier is fixed in this adjusted position by centering the dowel-shaped pins 186 in the holes 187 in the top flange of the carrier C (Fig. 6) whereupon the slotted guide 181 is clamped by nuts 180 and 184 to hold the parts in the relationship shown. Thereafter, the course can be plotted as magnetic, or compass with 0 deviation, for variation is thus completely compensated for.

If the variation is easterly, the arrangement is reversed, in that left hand pin 164 is removed and the carrier C with its chart is swung about right hand pin 163 as a pivot until the pointer 191 on the left end of the carrier points to the number of degrees on the easterly variation scale 188 that the compass rose shows to be the variation of the area passed through by the course to be steered. Such an easterly variation compensating position is shown by the dotted lines in Fig. 6. When easterly variation is to be compensated for, the right hand edge of the chart should not extend substantially beyond the right hand end of the carrier C, and to make this possible, the clamp 127 with its parallel arms is shifted from the upper left corner of the baseboard 110 to the upper right hand corner. When the carrier is to be returned to normal or unused position, it can be clamped so, by pivotally moving or swinging the spring finger 177 over the carrier, as shown in Figs. 7 and 8, and of course, the previously removed pin is restored to normal position. In order to permit the reversal of position of the clamp 127 with its parallel arms 125 and 119, there must be a reversal of the direction in which they are attached to the cruciform member 121. To that end, Fig. 14 shows how the parts may be readily dis-assembled by removing the pivot screws 122, and the pivot screws replaced when the parts are reassembled to maintain them in reassembled relationship. The position taken by the clamp 127 and its rearranged parallel arms 125 and 119 is shown also in dotted lines in Fig. 6.

In practical operation, the operator observes from his chart the variation of the compass in that general area of the chart through which the vessel's course transits, especially as to whether it is easterly or westerly. Next, the operator clamps the chart in the carrier C by means of the adjustable clamps 175 and nuts 176 so positioned that the free or extending top edge portion of the chart passes through the slot 170 under the horn-end 168 or 169 of the carrier, as the case may be. If the variation is westerly, then the chart is extended through the right hand slot, as can be seen in Fig. 6. The right hand pin 163 is removed and the carrier is then swung about pin 164 as a pivot, until the pointer 190 at the right end of the carrier C points to the number of degrees on the scale 189 that are equal to the degrees and their subdivisions that are indicated on the compass rose. In this position, the parts are clamped by means of the slotted guide 181 and its nuts 180 and 184, so that the parts are positioned as shown in Fig. 6, variation thus having been compensated for.

Then in order to compensate for deviation, one or the other of the straight-edges of the ruler 150 (both of whose edges are parallel to the line connecting the zero and 180° marks on scale 12 of disc 11) is adjusted to lie on the chart parallel the course desired to be steered, which adjusted positioning can be done readily by means of the parallel arms 125 and 119. Next, the operator observes through the slot 40 of the deviation compensator plate 17 that part of the graph 35 on card 30 that shows through the slot, how many degrees, and subdivisions thereof, if any, the exposed portion of the graph is above the 0° deviation line 43 marked on the plate 17. This number of degrees and possibly fractions thereof, are then added by the operator to the number of degrees on the scale 12 on disc 11 that is aligned with edge 41 of the beveled edge of the plate 17—the sum being the compass course to be steered with both variables of variation and deviation being compensated for.

Suppose now that when running the charted course, the operator wants to take a bearing on some fixed object. He flips up the dowel-like pins 186 out of holes 187 in the carrier C and pivots the slotted guide 181 about its horizontal pivot to a position free and clear of the chart. The carrier C with its chart still clamped in place, is swung back into normal position, as shown in Fig. 7, and the spring finger 177 flipped over it to hold it in this normal position. A compass bearing is then taken on the object. From the compass bearing, is subtracted the number of degrees lying between the graph 36 on card 30 and the 0° deviation line 43 marked on plate 17, whereupon the operator is thus informed of the compass bearing of the observed object from his vessel and marks it on the chart. Then, the operator quickly unflips the spring finger 177 to free the carrier C with its chart, and pivots the carrier again, meanwhile pivoting back to carrier holding position, the slotted guide 181 until its dowel pins slip into the holes 187, and the parts are ready for further use in compass-to-chart relationship, whereupon the operator can then see the relation of his course to that object. In other words, when using chart-to-compass relationship, the carrier C with its chart is adjusted as shown for instance in Fig. 6, whereas when using compass-to-chart relationship, the carrier C and its chart is adjusted as shown in Fig. 7. That is, the chart is at the variation angle to the baseboard 110 for running a course, whereas for taking bearings, the chart is straight with the board and its meridians are at 90° angle with the top edge of the baseboard. Since the magnetic course is really deviation from the compass reading, the disc 11 is used to give the magnetic course. And as the chart itself is adjusted to compensate for the variation, the reading of the disc 11 as used in my total combination, shows directly the true course.

The pins 163 and 164 must be removed and replaced as is appropriate to the desired position of the carrier C to the channel 156. The changing of the clamp 127 with its parallel arms 125 and 119, as well as its disc 11 and the straight edge or ruler, from the left hand side of the baseboard 110 to the right hand when easterly variation is to be compensated for (rather than westerly variation as shown in Fig. 6) because it will be easier to handle, for otherwise, in the left hand position, the operator is manipulating the apparatus away from the radius of action instead of into it.

The apparatus that embodies this invention has many advantages. It is small, neat and compact. Because of its capabilities, the chart can be folded when applied in position in it, as much as one-fourth the normal extent of the chart. Such compactness is highly desirable on small vessels, especially such as are used for coastal and inland defense patrol. Such craft are usually of very high speed, where quick turns are needed, but this apparatus is equal to such occasions for the new course can be laid quickly and deviation can be checked almost instantly. Nothing needs to be remembered or written down. And, when the knob 19 is tightened after obtaining the last course, both compass and magnetic, remains visibly indicated in the apparatus, even though both compass and chart should be moved to another part of the boat. The instrument shows all that the operator needs to know. And finally, the instrument can be stowed readily on the smallest vessels.

Naturally, the invention is capable of other embodiments than the one shown, so the criterion of what comprises my invention is that which falls within the ambit of the appended claims, using, of course, the rules about equivalents and about reversal of parts.

For instance, instead of using the card 30 as made of paper, I contemplate that it may be of a material that presents a face surface or portion on which the data portraying graphs 35 and 36 may be readily erased or deleted. After such deletion, the surface or face is such that the operator can readily write in a new graph without the necessity of substituting one card for another in the disc assembly 11. Therefore, the erasibility of a graph from the card or its equivalent surface, and the ready drawing in of a new graph, is a part of my concept of this invention.

Still another such modified embodiment that is still within my concept of this invention, is that the disc assembly 11 may be sold and used when provided with the ruler or straight-edge 150 in the relationship shown in Fig. 6, but removed from the parallel supporting arms 119 and 125. In other words, it is entirely possible to use as an independent deviation compensating device, the disc assembly 11 plus the ruler 150, without necessarily having it connected with anything else. Moreover, instead of clamping the parallel arms and the deviation compensating device to the particular baseboard shown herein to be my preferred embodiment, the deviation compensating device could, of course, be clamped or otherwise fastened to a full sized chart table, such as is used on ocean going or other commercial vessels.

The devices of this invention may, of course, be used on airplanes.

I claim:

1. Apparatus of the class described which comprises an apertured bottom sheet, an annular scale associated therewith marked in 360° of an arc, an apertured plate whose aperture is aligned with the aperture of the bottom sheet and presenting a radially-extending edge bearing scale markings, and means for clamping the foregoing parts together, characterized by an apertured annular card bearing two graphs of which one indicates a value extending for its major portion on one side of the aperture of the card while the major portion of the other indicates an opposite value extending on a substantially opposite side of that aperture, means for securing the card and scale in adjusted relationship, and two groups of lines marked on the sheet with the lines of one group extending at right angles to those of the other group.

2. Apparatus of the class described which comprises a sheet having scale markings on its peripheral section, an apertured plate member having scale markings thereon along a line radial thereof, an apertured card arranged concentric with the disc bearing on its face curving graphs of which one extending for its major part on one side of the aperture of the card indicates one value while the major portion of the other extending on a substantially opposite side of the aperture indicates an opposite value, means for securing the sheet and card together; and means for securing the plate and the card as well as the sheet together for relative movement therebetween.

3. Apparatus according to claim 2 with the addition of right-angled markings associated with the scale markings of the sheet.

HAROLD W. SLAUSON.